(12) United States Patent
Paterro (10) Patent No.: US 6,367,739 B1
(45) Date of Patent: Apr. 9, 2002

(54) COMPOUND EXHAUST SYSTEM

(76) Inventor: Von Friedrich C. Paterro, 6751 Ayala Avenue, 23-B 23$^{rd}$ Floor, Makati (PH), 1226

( * ) Notice: Subject to any disclaimer, the term of this patent is extended or adjusted under 35 U.S.C. 154(b) by 0 days.

(21) Appl. No.: 09/672,031

(22) Filed: Sep. 29, 2000

(51) Int. Cl.$^7$ ............................................... B64C 29/00
(52) U.S. Cl. ........................ 244/23 C; 244/62; 244/74
(58) Field of Search .................................. 244/53 R, 62, 244/73 R, 74, 172, 12.2, 23 C; 60/200.1, 207, 208, 224, 225

(56) References Cited

U.S. PATENT DOCUMENTS

| | | |
|---|---|---|
| 3,151,596 A | 10/1964 | McMurtrey |
| 3,252,281 A | 5/1966 | Everett et al. |
| 3,303,650 A | 2/1967 | Yonts |
| 3,353,354 A | 11/1967 | Friedman et al. |
| 3,402,555 A | 9/1968 | Piper |
| 3,547,379 A | 12/1970 | Kappus |
| 3,574,057 A | 4/1971 | Rom |
| 4,023,751 A * | 5/1977 | Richard .................... 244/23 C |
| 4,147,590 A | 4/1979 | Szekely |
| RE31,697 E | 10/1984 | Gomberg et al. |
| 5,730,390 A * | 3/1998 | Plichta et al. ............. 244/23 C |
| 5,873,239 A | 2/1999 | Culver |

OTHER PUBLICATIONS

"UFO Wreckage Washes Upon Oregon Beach", *Weekly World News*, 1997.
"Experts Confirm: 1997 Photo of UFO's Taken By Astronaut is Real", *Weekly World News*, 1998.
"U.S. Air Force Builds UFO", *Weekly World News*, Sep. 1996, p. 4.
"Undersea UFOs Prowling Earth's Oceans", *Weekly World News*, Oct. 1996, p. 3.
"Boeing Gets Bigger & Flies Higher", *Newsweek*, Aug. 1996, p. 49.
"New Metal Created", Source and date unknown.
U.S. Application No. 09/200,703 Specification and Drawings filed Nov. 27, 1998.

* cited by examiner

*Primary Examiner*—Galen L. Barefoot
(74) *Attorney, Agent, or Firm*—Oliff & Berridge, PLC (57) ABSTRACT

A compound exhaust system including two or more stages, preferably three, uses the force of exhaust gases traveling from a thrust generating source through the exhaust system to maximize thrust and minimize wasted energy consumption. In particular, the compound exhaust system for a thrust generating source comprises at least a first stage exhaust and a smaller, second stage exhaust. Various reflections of high speed traveling gases are provided and the resultant pressures induced during this travel supplement the thrust provided by the thrust generating source, which can be a jet engine. The invention also relates to a novel airframe that uses multiple engines having the inventive compound exhaust system.

18 Claims, 9 Drawing Sheets

COMPOUND EXHAUST SYSTEM

BACKGROUND OF THE INVENTION

1. Field of Invention

The invention relates to an improved compound exhaust system for engines in flying craft capable of increased energy efficiency.

2. Description of Related Art

Numerous aircraft and spacecraft utilize solid, gas or liquid fossil fuels in jet or rocket engines to provide thrust necessary for flight of the craft. While numerous improvements in engine efficiency have been achieved over the years, the main focus in further efficiency has been in the engine design itself and much energy is still wasted or needlessly expelled out the exhaust of such conventional jet or rocket engine exhaust systems.

There is a need for a more energy conserving exhaust system that can minimize wasted fuel by effectively obtaining more thrust for a given input supply of fuel.

SUMMARY OF THE INVENTION

Applicant has overcome the above long felt needs and desires by inventing a novel compound exhaust system that replicates additional thrust by reusing the exhaust several times over before it is spent out the final stage of the exhaust system.

The invention relates to a compound exhaust system including two or more stages, preferably three, that use the force of the exhaust gases traveling through the exhaust system to maximize thrust and minimize wasted energy consumption. In particular, the compound exhaust system for a thrust generating source comprises at least a first stage exhaust and a smaller, second stage exhaust, the first stage exhaust including an inlet control that receives exhaust gases travel at a high speed from a thrust generating source, the inlet control having a predetermined inlet diameter at a centerline of the exhaust;

a diverging conical wall extending from the inlet control to a lower support of the first stage, an inverted cone impact area in-line with the centerline, the inverted cone impact area having a diameter substantially the same as the diameter of the inlet control and being located between the lower support and the inlet control, a canalled solid impact area surface extending from the inverted cone impact area to the lower support, the canalled solid impact area and the diverging conical wall defining a first gas expansion area therebetween, the canalled solid impact area surface having a series of deep annular canals at an angle of about 45° to the centerline and a series of high speed jet nozzles extending between the canals, a first upper cone-shaped reaction area surface defined on a bottom surface of the canalled solid impact area surface and defining an upper boundary of a first upper cone-shaped gas reaction area, the series of high speed jet nozzles running parallel to the canals and extending through the canalled solid impact area to define a flow path between the first gas expansion area and the first upper cone-shaped gas reaction area, a lower high impact reaction area surface having a lower cone-shaped gas reaction area surface located along the centerline and defining a lower boundary of the upper cone-shaped gas reaction area, the lower high impact reaction area surface also having a diverging conical element extending from the lower cone-shaped gas reaction area surface to the lower support, and a first low pressure gas overflow channel in fluid communication with the first upper cone-shaped reaction area, the first low pressure gas overflow channel being defined along a periphery of the lower support of the first stage and channeling gases from the first upper cone-shaped reaction area to the second stage of the exhaust system, and the second stage exhaust including a converging conical wall extending from the lower support of the first stage to a lower support of the second stage, a second inverted cone impact area in-line with the centerline, the second inverted cone impact area having a diameter smaller than the diameter of the inlet control and being located between the lower support of the first stage and the lower support of the second stage, a second canalled solid impact area surface extending from the second inverted cone impact area to the lower support of the second stage, the canalled solid impact area and the converging conical wall defining a second gas expansion area therebetween, the second canalled solid impact area surface having a second series of deep annular canals at an angle of about 45° to the centerline and a second series of high speed jet nozzles extending between the second canals and also angled at about 45°, a second upper cone-shaped reaction area surface defined on a bottom surface of the second canalled solid impact area surface and defining an upper boundary of a second upper cone-shaped gas reaction area, the second series of high speed jet nozzles running parallel to the second canals and extending through the second canalled solid impact area surface to define a flow path between the second gas expansion area and the second upper cone-shaped gas reaction area, a second lower high impact reaction area surface having a second lower cone-shaped gas reaction area surface located along the centerline defining a lower boundary of the second upper cone-shaped gas reaction area, the lower high impact reaction area surface also having a diverging conical element extending from the lower cone-shaped gas reaction area surface to the lower support, and a second low pressure gas overflow channel in fluid communication with the second upper cone-shaped reaction area, the second low pressure gas overflow channel being defined along a periphery of the lower support of the second stage and channeling gases from the second upper cone-shaped reaction area toward a thrust vectoring nozzle located downstream from the second stage of the compound exhaust system, which forms an exit from the compound exhaust system.

The invention also relates to a novel airframe that uses multiple engines having the inventive compound exhaust system.

BRIEF DESCRIPTION OF THE DRAWINGS

The invention will be described with reference to the following drawings wherein.

DETAILED DESCRIPTION OF PREFERRED EMBODIMENTS

Figure 1:
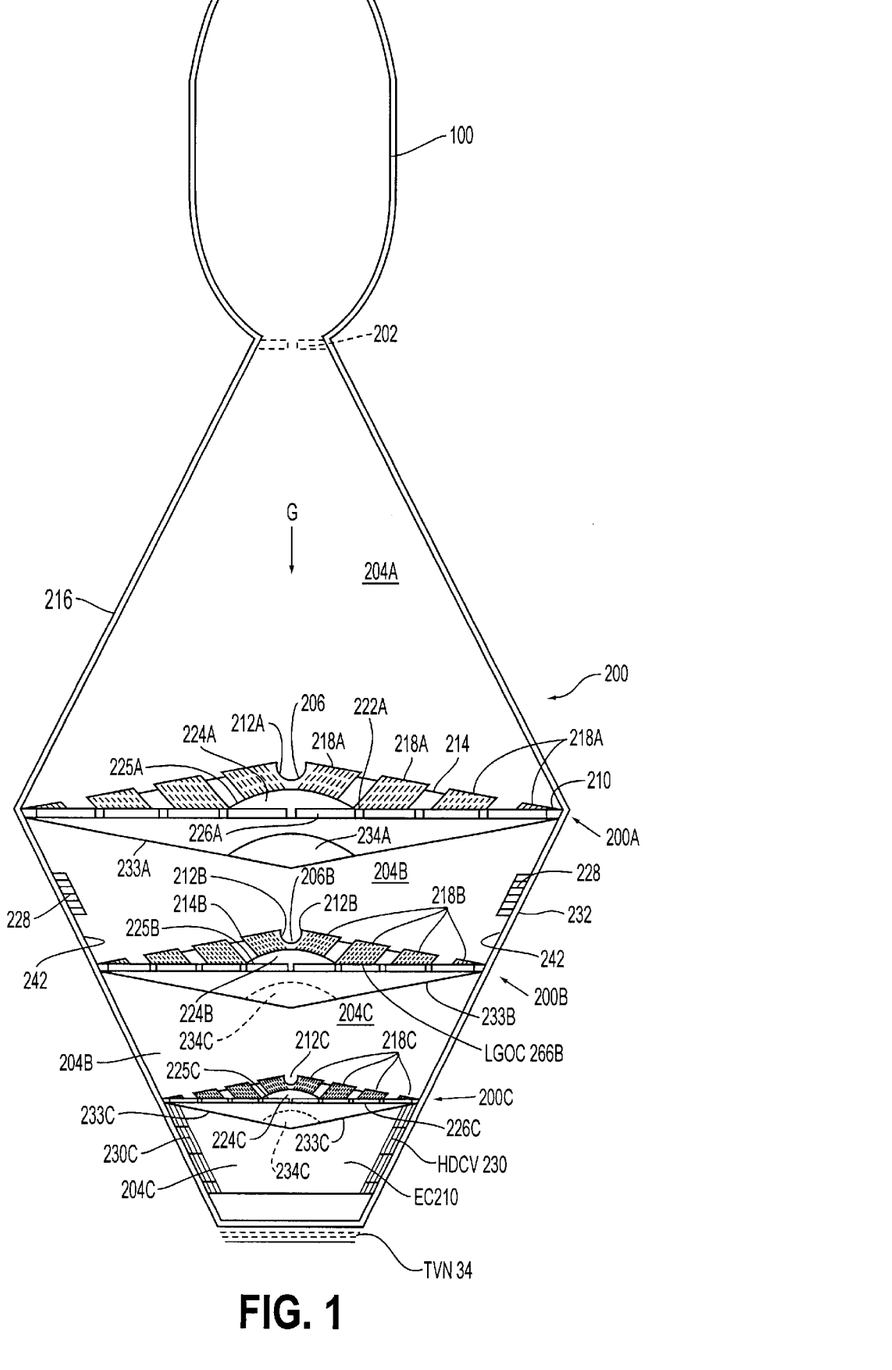
FIG. 1 is a cross-sectional view of a compound exhaust system according to a first embodiment of the invention.

With reference to FIG. 1, input to the inventive compound exhaust system 200 is a supply of high speed gases G that release energy and generate thrust to propel a vehicle, such as a flying craft, spacecraft or other vehicle. The high speed gases are created by a thrust source 100 that can include most any known conventional jet or rocket engine, such as a turbo-fan jet engine, or subsequently developed technology that achieves thrust and generates similar exhaust gases. This is not limited to liquid, gas or solid fossil fuel engines, but can include alternative thrust sources such as the water and air propulsion system disclosed in my U.S. patent application Ser. No. 09/200,703, now U.S. Pat. No. 6,290,184, the subject matter of which is incorporated herein in its entirety. However, the actual method or apparatus for initial thrust generation is not the primary subject of this invention. Rather, this invention primarily focuses on exhausting of these gases G to increase thrust and efficiency.

Figure 2:
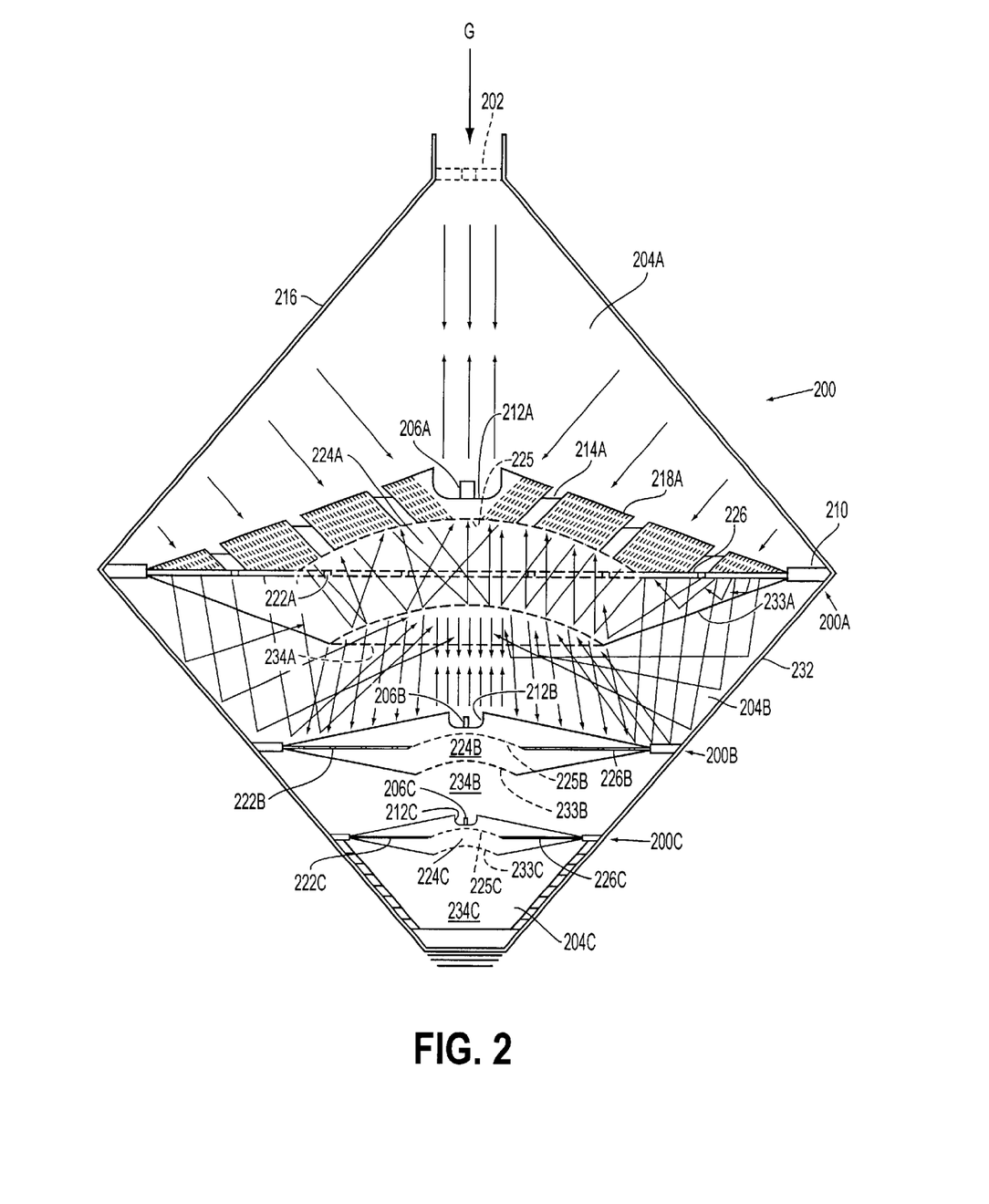
FIG. 2 is another cross-sectional view of the compound exhaust system showing exhaust flow through the system.

Thrust source 100 generates exhaust gases G that travel towards compound exhaust system 200, which as shown is a three-stage exhaust system including first stage 200A, second stage 200B and third stage 200C. Each stage includes a rim 236A, 236B, and 236C, respectively, that seals and spaces the stage from adjacent stages. The first stage 200A has a relatively large gas expansion area (GEA) 204A formed in the shape of an inverted cone. The second stage 200B has a smaller GEA 204B. The third stage 200C has an even smaller GEA 200C, which makes the accelerated gases travel faster due to the high pressure after the expanding gases flow from the second stage 200B in greater volume into the third stage 200C. More detailed views of the exhaust system are illustrated in FIG. 2. While three stages are preferred, the invention can be practiced with as few as two stages or could include four or more stages depending on the desired application.

As shown in FIGS. 1–2, air duct control 202 at the inlet of exhaust system 200 has a diameter that is equal to the diameter of an inverted cone impact area (ICIA) 212A of the first stage 200A of the exhaust system. Highly accelerated gases rushing down the ICIA 212A from air duct control 202 have a compound tubular (solid) shape and upon impact with the ICIA 212A and directional pin 206 rise upward within gas expansion area (GEA) 204A toward the height of the air duct control 202 where pressure is greater due to a tapered conical top wall 216 of the exhaust system 200. This augments the original thrust of the system by pushing the new supply of gases G upward, as well as providing lift forces to wall 216.

Upon reaching air duct control 202, the rising gases are pushed down by the greater forces of the new gases coming from the thrust source 100 and then forced left, partially due to the directional pin 206, to spin downward towards to the canalled solid impact area (CSIA) 214A, which includes deep canals 215 angled 45° towards the center, causing the spinning gases to continue spinning through all the CSIA 214A. This spinning creates a tornado effect as the gases G rise once more within the circumferential area of the tapered conical top part 216 of the exhaust system 200, which creates additional upward thrust while the bulk of the spinning accelerated gases are forced downward by the rush of new gases from air duct control 202 toward angled high speed jet nozzles (HSJN) 218A provided in CSIA 214A at a 45° angle. A central lower side of the CSIA 214A is dome-shaped.

After the gases travel through the high speed jet nozzles 218, the gases exit and converge toward a center line of a first lower cone-shaped gas reaction area surface (LCSGRAS) 233A, which includes a centrally located raised dome portion and a conical section extending from the dome portion to a lower support 222A of the first stage 200A. High speed gases coming from nozzles 218A nearest the ring 236A (i.e., outer peripheral nozzles) will ride on top of highly accelerated gases coming from high speed nozzles 218A located on top of an upper cone-shaped gas reaction area (first UCSGRA) 224A, which is defined between a first upper cone-shaped gas reaction area surface (first UCSGRAS) 225A formed on a lower side of the canalled solid impact area 214 and the first LCSGRAS 233A.

These gases travel toward the center of the first UCSGRA 224A which, by the time these gases reach a spot where high speed gases from the first UCSGRA 224A meet, form a solid wall of high speed gases. Thus, all accelerated gases coming from all sectors of the first stage exhaust hit a lower cone-shaped gas reaction area (first LCSGRA 234A) and curve upwards in a spiral continuously moving towards the first UCSGRA 224A. Upon impact with the much stronger expanded gases coming out from the top portion of the first UCSGRA 224A, an upward pressure ensues at the center of the first UCSGRA 224A that produces a large upward push while the spiraling widens its curvature and rushes towards and out an angled gas overflow chamber (GOC) 226A located around the periphery of the bottom of the first stage 200A. Thus, the gas flow has an involute action, spiraling continuously around a point in constantly increasing curvature until it reaches the GOC 226A.

GOC 226A is preferably louvered at a 45° angle towards a center of second stage 200B of the compound exhaust system. GOC 226A is located a little lower than a top portion of the lower section 233A. GOC 226A can be louvered by carving louvers from a solid wall or by boring oversized gas nozzles angled 45° towards the center of the lower stage. The louvers and/or gas nozzles are formed of a suitable size relative to the other dimensions of the exhaust system. When a large volume of accelerated gases pass through the louvered low pressure gas overflow channel 226, the pressure at the first UCSRA 224A becomes greater producing additional thrust. Thus, the angled high speed jet nozzles 218 and angled gas overflow channel 226A contribute to thrust.

Gases exiting the first stage 200A through gas overflow channel 226A descend downward into gas expansion area (GEA) 204B toward a second ICIA 212B of the second stage 200B, where the gases replicate the action and reaction forces created in the first stage by way of involute action until they exit from gas overflow chamber (GOC) 226B of the second stage 200B into the third stage 200C, where the gases again encounter the same forces.

That is, gases from GEA 204B are funneled toward ICIA 212B and upon impact rise upward toward the lower side of LCSGRA 234A where they are pushed down by new gases flowing from the GOC 226A and forced to spin downward toward CSIA 214B, which causes the gases to rise once more in a tornado effect. These gases then spin toward and through nozzles 218B, where upon exit the gases converge toward LCSGRAS 233B. From here, the gases travel toward the center of the second UCSGRA 224B. The gases then curve upward in a spiral where they meet new gases and are forced to spiral in a widening curvature until they rush out gas overflow chamber (GOC) 226B into the third stage 200C. Gas flow through the third stage is the same as through the second stage. Upon exit of the gases through gas overflow chamber 226C of the third stage, the gases travel into an exhaust chamber (EC) 210, which is located between the third stage 200C and thrust vectoring nozzle (TVN) 34. Gases entering EC 210 travel through TVN 34 at very high speeds. The TVN 34 has a diameter equal to the gas entry point 202.

Figure 3:
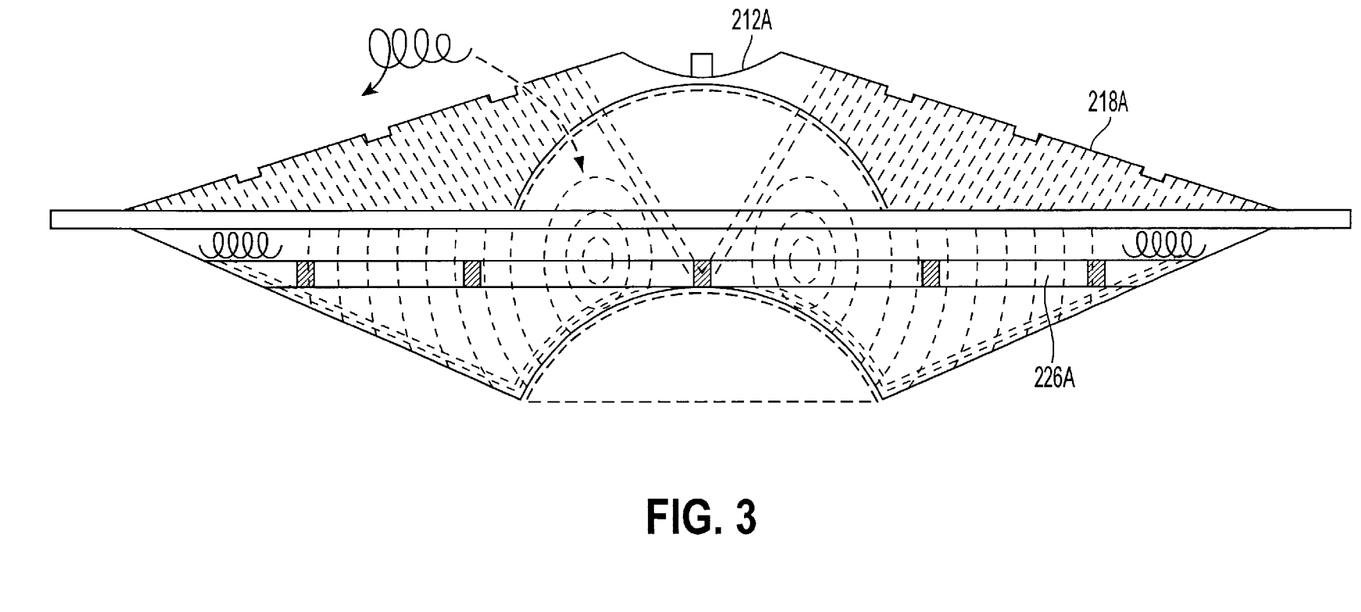
FIG. 3 is a cross-sectional view of a first stage of the exhaust system according to the invention.

In summary, the gas flow through the system enters the exhaust through gas entry point 202 into the first stage 200A in a solid tubular shape, rushing towards ICSIA 212A and upon hitting the same will rise upwards, but since the new incoming gases have greater speed and pressure, the gases are pushed back downwards in a spinning condition towards the canalled area, which creates a tornado effect inside the gas expansion area continuously pushing the device attached to the exhaust upward. Other gases within the gas expansion area begin to exit the nozzles 218 towards a lower section of the first section. As the nozzles 218 are angled at 45 degrees towards the lower cone-shaped gas reaction area will develop an involute action around the hollow disc-shaped lower section of the first stage. See FIG. 3, which better illustrates the gas flow through the first stage where the curvature of the accelerating gases in the involute state increase in width and hit the edges of the gas overflow channel, which is angled 45 degrees towards the gas reaction area of the second stage. With this construction, accelerated gases will flow out of the gas overflow channel in greater volume, thus producing an increased upward pressure against the upper cone-shaped gas reaction area pushing the craft upward. All highly accelerated gases emerging from the gas overflow channel mass together toward the center of the second stage, where the process is repeated until it exits out TVN 34.

Figure 4A:
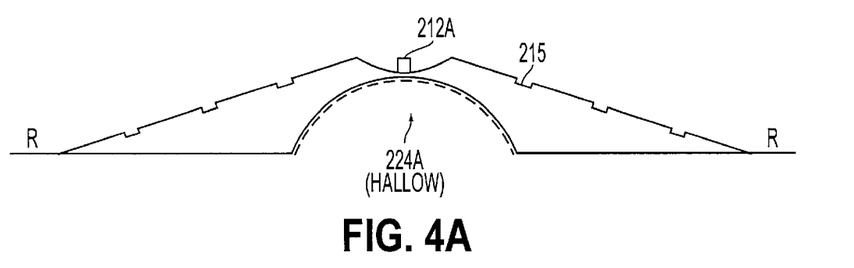
FIGS. 4A–D show various sections of an exemplary stage according to the invention.
Figure 4B:
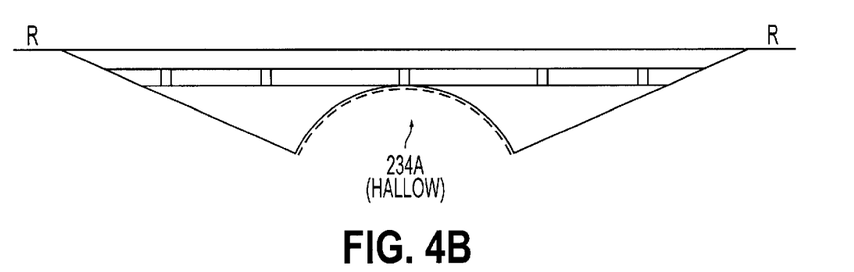
Figure 4C:
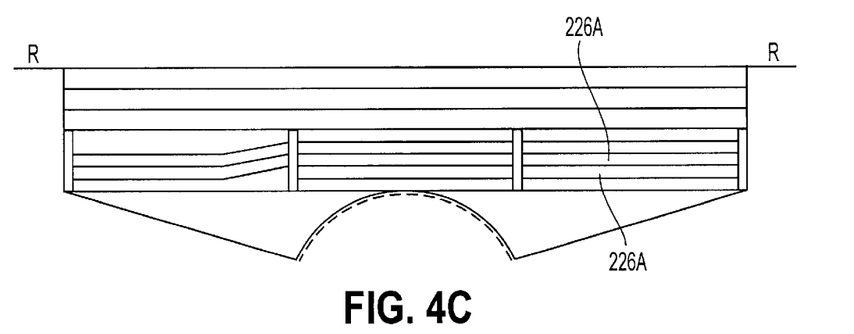
Figure 4D:
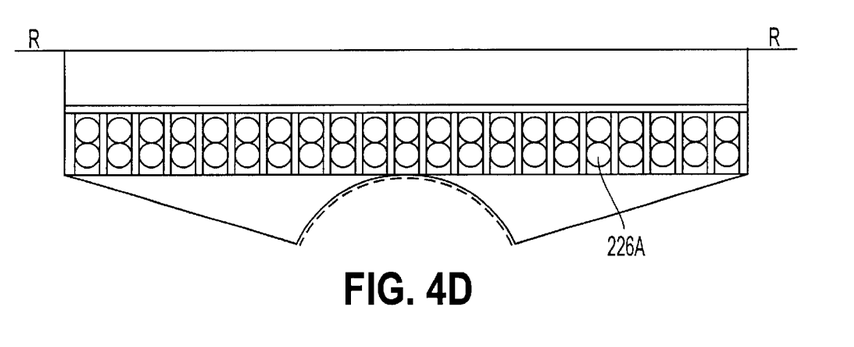

FIGS. 4A–D show various sections of the first stage. FIG. 4A shows an upper section having the ICIA 212A, canals 215 and first upper cone-shaped gas reaction area 224A. The upper section is solid with high speed jet nozzles 218 except for the upper cone-shaped gas reaction area 224A. FIG. 4B shows a lower section, which is hollow and includes the lower cone-shaped gas reaction area 233A. FIG. 4C shows a gas overflow channel 226A having louvers angled at 45 degrees. Alternatively, as shown in FIG. 4D, the gas overflow channel 226A can have oversize nozzles to handle gas flow.

Thrust can be supplemented by chilled air entry valves (CAEV) 228 (see FIG. 1) which are high pressure valves that spray a fine pressurized chilled air from a source and deliver the chilled air within the second gas expansion area 204B. The chilled air rapidly expands when heated, causing additional pressure within the second gas expansion area 204B and additional thrust. One or more electronic sparkplugs 242 may also be provided in the second stage when the power source is an air-breathing engine or rocket to provide continuous or intermittent sparks around the gas expansion area of the second stage to further burn all fine combustibles coming from the gas overflow channel of the first stage to further assist in trust generation.

The inventive compound exhaust system can be used in conjunction with various power sources, such as air-breathing engines, rockets, or other combustion-related engines. Various dimensions of the elements will vary depending on the particular application, such as engine capacity, cargo capacity, whether the exhaust will be used in normal atmosphere or in space, and other considerations.

Figure 5:
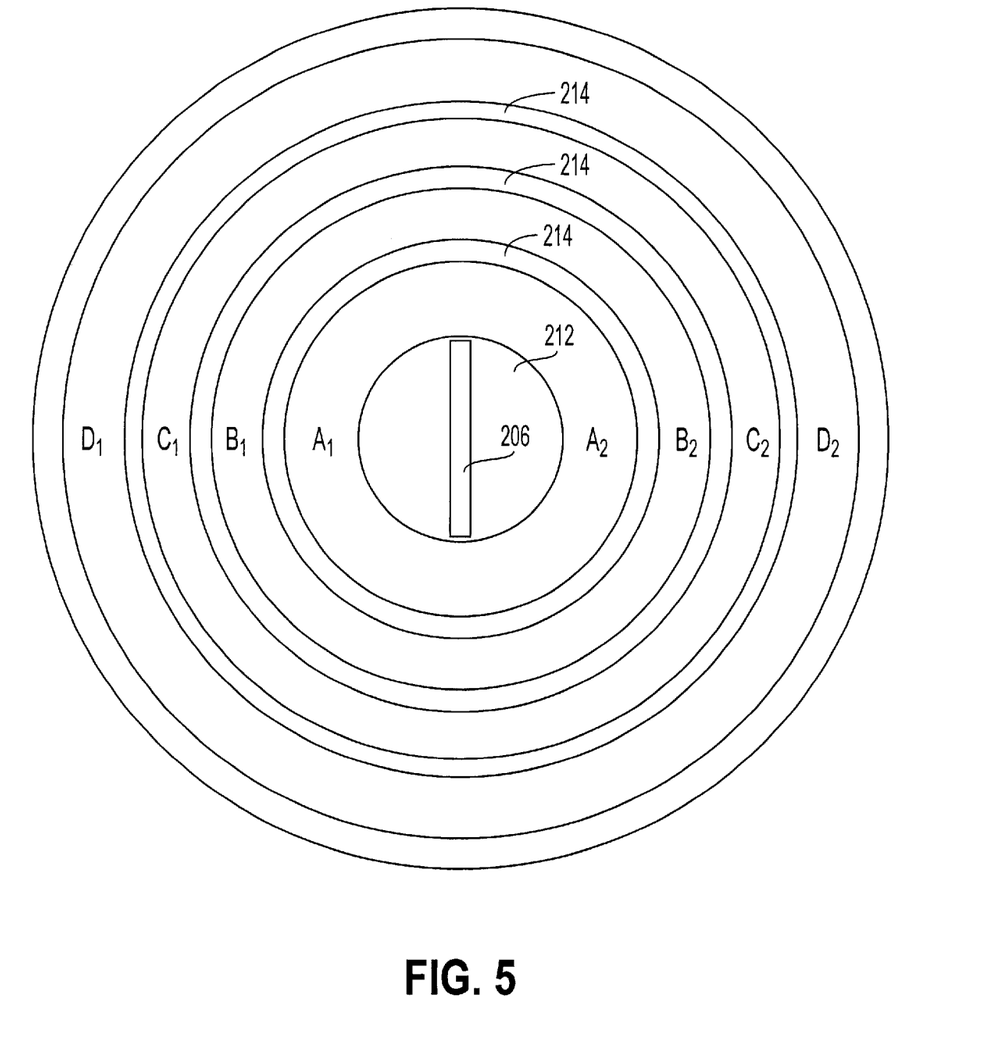
FIG. 5 is a top internal view of the exhaust system shown in FIGS. 1–2.
Figure 6:
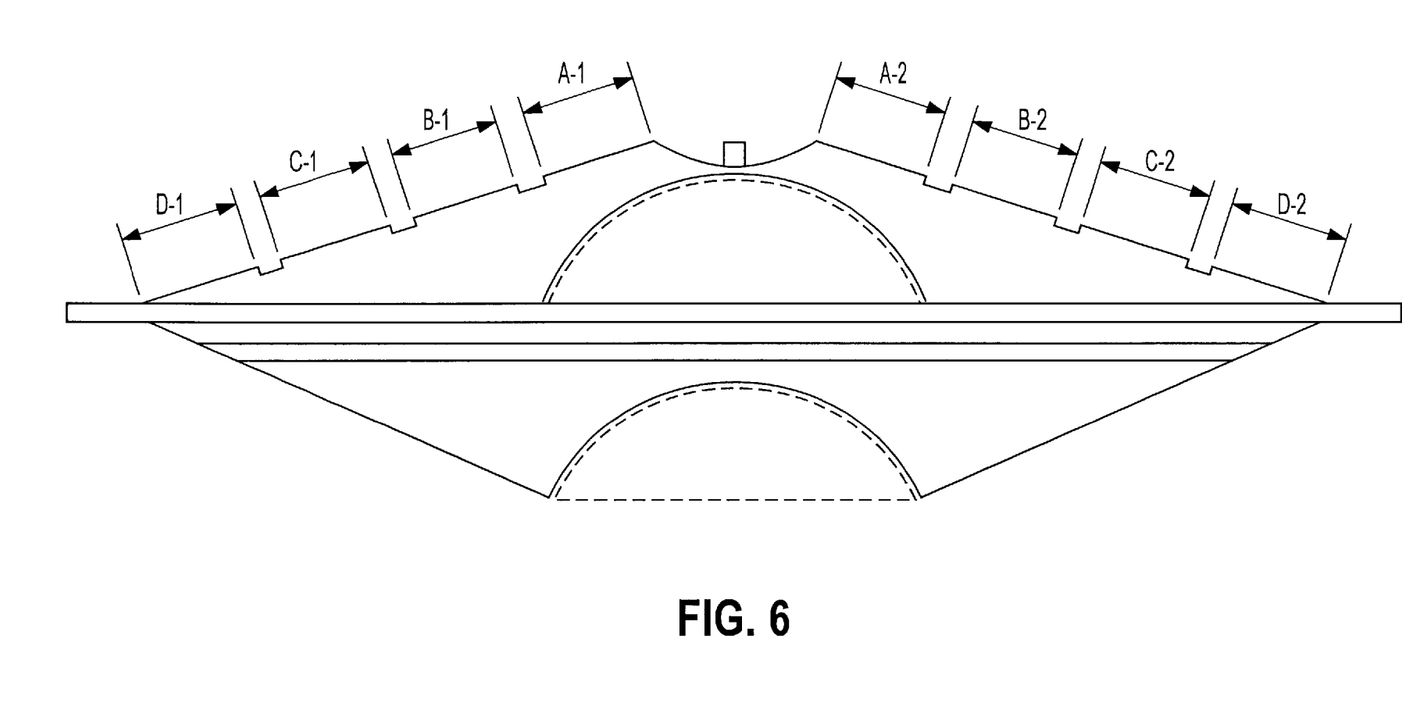
FIG. 6 is a cross-sectional view of a first stage of the exhaust system showing dimensioning according to the invention.

In a first embodiment, the upper section of each stage 200A, 200B and 200C is divided into four sections, labeled A, B, C and D. Each section is subdivided into two hemispheres to provide eight regions A1, A2, B11, B2, C1, C2, D1 and D2 as shown in FIGS. 5 and 6. The four sections A, B, C and D are separated by canalled impact areas (CIA) 214. Each section is made up of a solid metal material having a plurality of high speed nozzles extending therethrough at a 45 degree angle. The nozzle diameter preferably varies from one stage to the next. For example, in a first embodiment, the regions within the first through third stages may have the following sizes:

TABLE 1

| STAGE | REGION | SIZE |
| --- | --- | --- |
| FIRST STAGE | A1, A2 | ⅛" |
|  | B1, B2 | 1/16" |
|  | C1, C2 | 1/16" |
|  | D1, D2 | ¼" |
| SECOND STAGE | A1, A2 | ¼" |
|  | B1, B2 | ⅛" |
|  | C1, C2 | ⅛" |
|  | D1, D2 | ½" |
| THIRD STAGE | A1, A2 | ½" |
|  | B1, B2 | ¼" |
|  | C1, C2 | ¼" |
|  | D1, D2 | 1" |

In an alternative embodiment, the nozzle sizes are uniform in all of the first, second and third stages. The size is proportional to the size and type of fuselage used.

Figure 7:
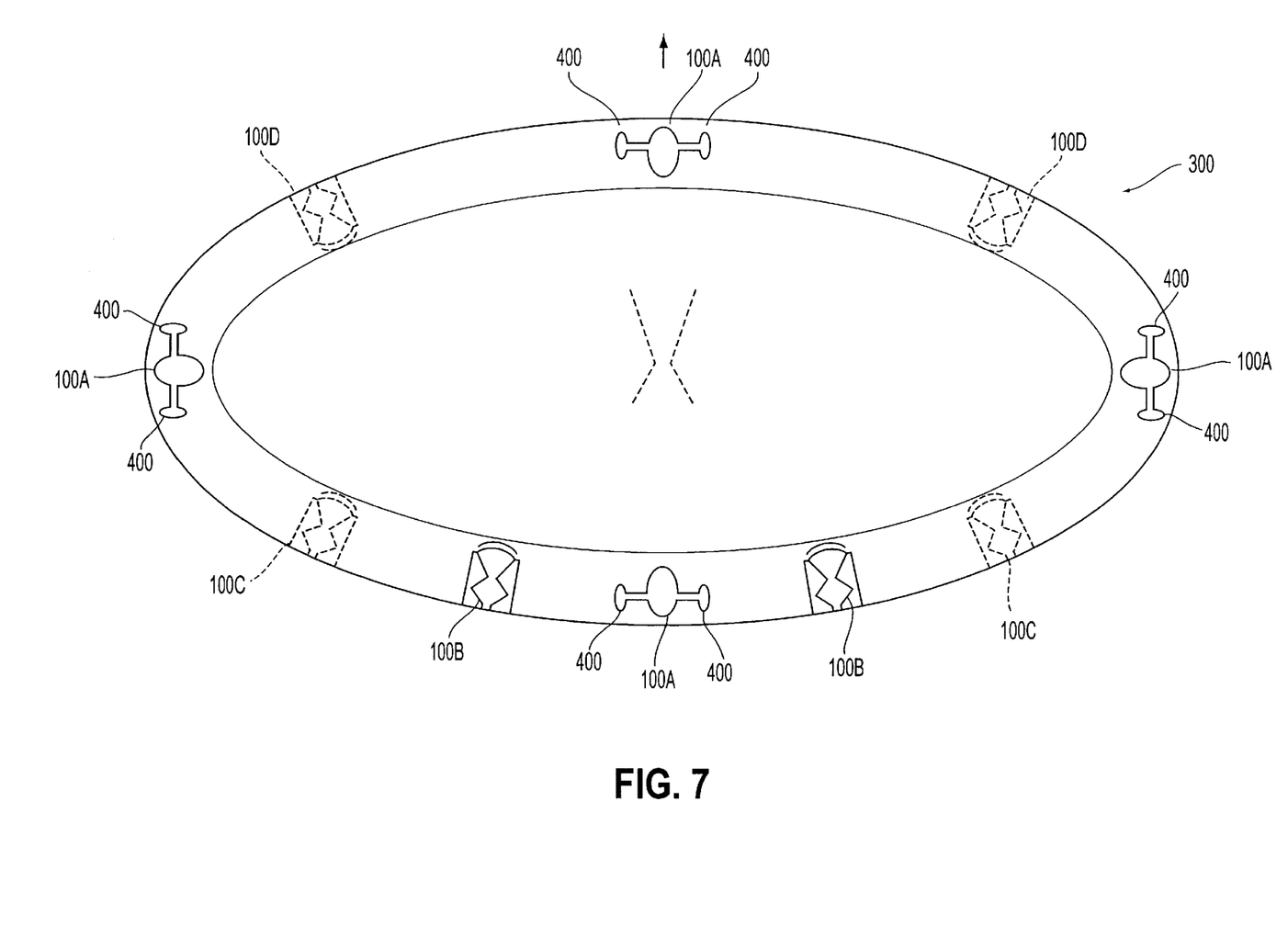
FIG. 7 is a perspective view of an exemplary fuselage that can achieve VTOL flight using several thrust sources with the inventive compound exhaust system.

The three stages 200A, 200B and 200C can be affixed to each other in several ways. In the embodiment shown, a circular rim 210 encircles the adjoining edges of adjacent stages and couples them together. As shown in FIG. 7, the inventive compound exhaust system can be used with a fuselage 300 to provide a vertical take-off and landing (VTOL) craft. While shown in a saucer-shaped configuration, the exhaust system is adapted for use with any type of vehicle fuselage.

In this configuration, the fuselage 300 includes five fixed turbo-fanjet engines 100A, two forward turbo-fan jet engines 100B, two forward reversible turbo-fan jet engines 100C, and two backward reversible turbo-fan engines 100D, along with drift control nozzles 400 located on each of the five fixed jet engines 100A as well as on upper, lower and side portions of fuselage 300 for a total of 24 drift control nozzles. Drift control nozzles 400 can be operated in pairs to correct for drift of the fuselage in flight.

During take-off, each of the five fixed jet engines 100A together with the jets 100B and 100C are throttled to provide thrust. Engines 100B and 100C are positioned vertically during take-off to assist in vertical thrust. Once a proper altitude is reached, the two forward reversible engines 100B and the two backward reversible engines 100C can be shut down and returned to a horizontal orientation. At this time, any of engines 100B, 100C or 100D can be throttled up to propel the craft forwards or backwards. Similarly, rotation or drift correction can be achieved by the drift correction nozzles 400. During forward flight, power to the fixed jets can be decreased.

Turning is achieved by relative control of the various jets. For example, steering or banking left can be achieved by making the fixed jets 100A on the left side decrease in power output (throttle down) while power to the fixed jets 100A on the right side is increased (throttle up). This results in the craft lowering its left side while the right side is raised. Downward turning can be achieved by reducing the power to the jet 100A at the front of the craft and/or increasing power to the jet 100A at the rear side of the craft.

Each of the engines 100A–D include the inventive compound exhaust system for improved efficiency. Each of the engines 100A–D may be 18,000 pound thrust jet engines.

Figure 8:
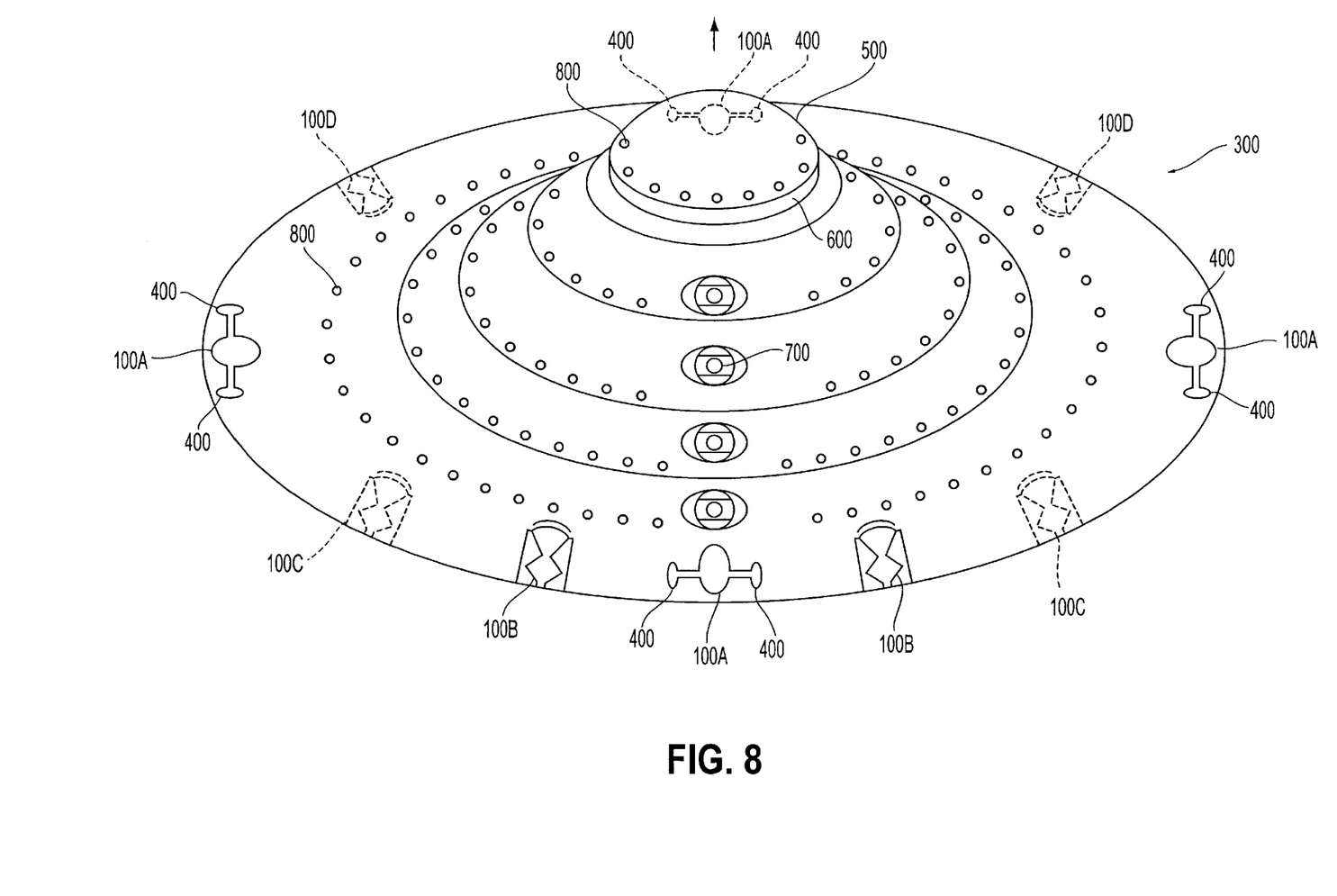
FIG. 8 is another perspective view of another exemplary fuselage that can achieve VTOL flight using several thrust sources with the inventive compound exhaust system.

FIG. 8 shows a VTOL airframe 300 according to another embodiment of the invention. Like numerals refer to like elements. In this embodiment, a cockpit 500 is provided on top of the saucer-shaped fuselage. Below cockpit 500 is air inlet 600. A series of doors 700 and windows 800 can be provided around the craft. The jet engines preferably are 18,000 pound thrust engines except the central engine 100A, which can have 36,000 pound thrust.

Figure 9:
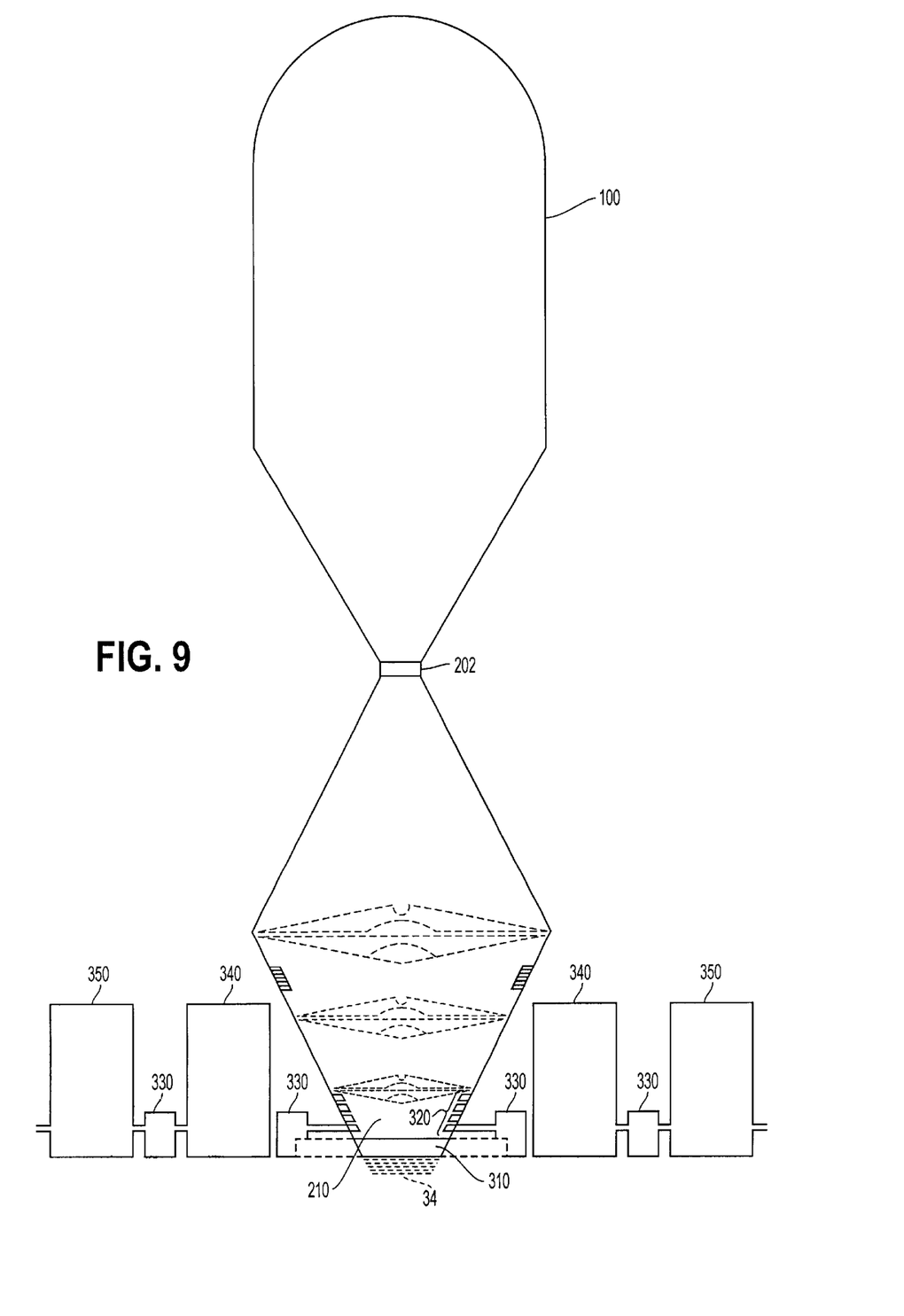
FIG. 9 is a cross-sectional view of an alternative embodiment of the invention using a non-air breathing thrust generation source.

The inventive compound exhaust system has been shown in the previous examples to be useable with various power sources, such as air-breathing engines, rockets, or other combustion-related engines. However, the invention is also applicable to non-air breathing thrust generating power sources. An exemplary embodiment of such is illustrated in FIG. 9. The thrust generating source 100 may use, for example, water ($H_2O$) and/or liquid hydrogen ($H_2$) as fuel. The compound exhaust system in this embodiment is provided with an automatic retractable air tight locking device 310 at the periphery of exhaust chamber 210 that will trap expanding gases. Multiple similar vacuum-locking doors 320 may be provided above locking device 310 around the exhaust chamber 210 that are in communication with multiple efficient compressors 330 that are capable of sucking out the trapped gases and pump them into multiple condensers 340 that convert the gases back to a liquid state. Thereafter, the converted liquid is again pumped back to a fuel cell 350 to be recycled and later fed to the thrust source 100. The vacuum-doors 320 are preferably located about one foot above the air tight locking device 310.

In operation, gases pass from the thrust source 100 through the three (or more) stages of the compound exhaust system 200 up to the exhaust chamber 210 where the gases are contained by the locking device 310. Thereafter, the multiple vacuum-doors 320 may be opened to allow sucking of the gases by the multiple compressors 330 to the multiple condensers 340 where the gases are converted back to their liquid state and thereafter pumped back to a fuel cell 350.

The locking device 310 at the periphery of exhaust chamber 210 may be openable to allow maintenance. The locking device 310 may also be openable to allow the superheated exiting gases to be released to the atmosphere. This may form a thick cloud of vapors, which may be a harmless byproduct or a desirable stealth mechanism that can at least partially conceal the craft.

In another embodiment, the flying craft can be used for interplanetary flight. The fuselage in such an embodiment would be designed to withstand the pressures and temperatures encountered when exiting or entering earth's atmosphere. Additionally, the fuselage would be pressurized. Optionally, when traveling through space, the exhaust gases can be vented back into the craft by a vacuum system powered by compressors so that the exhaust gases can be recycled.

To handle the forces generated by the novel propulsion system, the exhaust should be made from a suitable high strength, high heat metal. Numerous suitable metals or composite materials would be known to one of ordinary skill in the art. One such suitable material is KM-1557. The remainder of the spacecraft can be made from suitable materials based on desired requirements for each component, based on its size, strength, weight, and intended use of the flying craft.

While specific aspects of the invention have been described with respect to preferred embodiments of the invention, these are not intended to be limiting. Various modifications can be made without departing from the scope of the appended claims.

What is claimed is:

1. A compound exhaust system for a thrust generating source comprising at least a first stage exhaust and a smaller, second stage exhaust, the first stage exhaust including
an inlet control that receives exhaust gases travel at a high speed from a thrust generating source, the inlet control having a predetermined inlet diameter at a centerline of the exhaust;
a diverging conical wall extending from the inlet control to a lower support of the first stage,
an inverted cone impact area in-line with the centerline, the inverted cone impact area having a diameter substantially the same as the diameter of the inlet control and being located between the lower support and the inlet control,
a canalled solid impact area surface extending from the inverted cone impact area to the lower support, the canalled solid impact area and the diverging conical wall defining a first gas expansion area therebetween, the canalled solid impact area surface having a series of deep annular canals at an angle of about 45° to the centerline and a series of high speed jet nozzles extending between the canals,
a first upper cone-shaped reaction area surface defined on a bottom surface of the canalled solid impact area surface and defining an upper boundary of a first upper cone-shaped gas reaction area, the series of high speed jet nozzles running parallel to the canals and extending through the canalled solid impact area to define a flow path between the first gas expansion area and the first upper cone-shaped gas reaction area,
a lower high impact reaction area surface having a lower cone-shaped gas reaction area surface located along the centerline and defining a lower boundary of the upper cone-shaped gas reaction area, the lower high impact reaction area surface also having a diverging conical element extending from the lower cone-shaped gas reaction area surface to the lower support, and
a first low pressure gas overflow channel in fluid communication with the first upper cone-shaped reaction area, the first low pressure gas overflow channel channeling gases from the first upper cone-shaped reaction area to the second stage of the exhaust system, the second stage exhaust including
- a converging conical wall extending from the lower support of the first stage to a lower support of the second stage,
- a second inverted cone impact area in-line with the centerline, the second inverted cone impact area having a diameter smaller than the diameter of the inlet control and being located between the lower support of the first stage and the lower support of the second stage,
- a second canalled solid impact area surface extending from the second inverted cone impact area to the lower support of the second stage, the canalled solid impact area and the converging conical wall defining a second gas expansion area therebetween, the second canalled solid impact area surface having a second series of deep annular canals at an angle of about 450 to the centerline and a second series of high speed jet nozzles extending between the second canals,
- a second upper cone-shaped reaction area surface defined on a bottom surface of the second canalled solid impact area surface and defining an upper boundary of a second upper cone-shaped gas reaction area, the second series of high speed jet nozzles running parallel to the second canals and extending through the second canalled solid impact area surface to define a flow path between the second gas expansion area and the second upper cone-shaped gas reaction area,
- a second lower high impact reaction area surface having a second lower cone-shaped gas reaction area surface located along the centerline defining a lower boundary of the second upper cone-shaped gas reaction area, the lower high impact reaction area surface also having a diverging conical element extending from the lower cone-shaped gas reaction area surface to the lower support, and
- a second low pressure gas overflow channel in fluid communication with the second upper cone-shaped reaction area, the second low pressure gas overflow channel channeling gases from the second upper cone-shaped reaction area toward a thrust vectoring nozzle located downstream from the second stage of the compound exhaust system and forming an exit from the compound exhaust system.

2. The compound exhaust system of claim 1, further comprising a third stage attached between the second stage and the thrust vectoring nozzle, the third stage being smaller than the second stage.

3. The compound exhaust system of claim 1, wherein the second stage includes at least one chilled air entry valve that provides a supply of chilled air to the second gas expansion area.

4. The compound exhaust system of claim 1, wherein a directional control pin that directs gas flow is positioned within the inverse cone impact area.

5. The compound exhaust system of claim 1, wherein three annular canals are provided on each of the first and second canalled solid impact area surfaces.

6. The compound exhaust system of claim 1, wherein a size and profile of the first upper cone-shaped gas reaction area surface and the first lower cone-shaped gas reaction area surface are substantially the same.

7. The compound exhaust system of claim 1, wherein the first and second stages are sealingly connected.

8. A combination jet engine and exhaust comprising a jet engine and the compound exhaust system of claim 1, wherein an outlet of the jet engine is connected to the inlet control of the compound exhaust system.

9. The combination jet engine and exhaust of claim 8, wherein the jet engine is a turbo-fan jet engine.

10. An aircraft comprising:
- a fuselage;
- a thrust generating source connected to the fuselage, the thrust generating source including an output for expelling high speed gases ; and
- the compound exhaust system of claim 1 connected to the output.

11. The aircraft of claim 10, wherein the thrust generating source is a jet engine.

12. The aircraft of claim 10, wherein the fuselage is saucer-shaped.

13. The aircraft of claim 12, wherein the fuselage includes multiple thrust generating sources, each connected to a compound exhaust system according to claim 1.

14. The aircraft of claim 13, wherein at least one of the thrust generating sources is oriented vertically and provides vertical thrust to the fuselage.

15. The aircraft of claim 14, wherein at least another one of the thrust generating sources is oriented horizontally and provides horizontal thrust to the fuselage.

16. The aircraft of claim 10, further comprising a locking device that traps exhaust gases in the exhaust chamber.

17. The aircraft of claim 16, further comprising one or more vacuum doors that suck trapped gases from the exhaust chamber by a compressor to a compressor.

18. The aircraft of claim 17, wherein the compressor is connected to a fuel cell and the gases entering the compressor are converted to a liquid state and pumped to the fuel cell.

* * * * *